(12) United States Patent
Ur

(10) Patent No.: US 7,958,400 B2
(45) Date of Patent: Jun. 7, 2011

(54) DETECTING UNEXPECTED IMPACT OF SOFTWARE CHANGES USING COVERAGE ANALYSIS

(75) Inventor: Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 11/735,512

(22) Filed: Apr. 16, 2007

(65) Prior Publication Data

US 2008/0256393 A1    Oct. 16, 2008

(51) Int. Cl.
    *G06F 11/00* (2006.01)
(52) U.S. Cl. ............ 714/38; 717/124; 717/136
(58) Field of Classification Search ........ 714/38; 717/124, 136
    See application file for complete search history.

(56) References Cited

U.S. PATENT DOCUMENTS

| | | | |
|---|---|---|---|
| 5,778,169 A * | 7/1998 | Reinhardt | 714/38 |
| 6,314,558 B1 * | 11/2001 | Angel et al. | 717/118 |
| 6,415,396 B1 * | 7/2002 | Singh et al. | 714/38 |
| 6,536,036 B1 * | 3/2003 | Pavela | 717/125 |
| 6,748,584 B1 * | 6/2004 | Witchel et al. | 717/136 |
| 7,167,870 B2 * | 1/2007 | Avvari et al. | 1/1 |
| 7,222,338 B2 * | 5/2007 | Bae | 717/168 |
| 7,296,261 B2 * | 11/2007 | Witchel et al. | 717/136 |
| 7,603,660 B2 * | 10/2009 | Davia et al. | 717/128 |
| 2003/0093716 A1 * | 5/2003 | Farchi et al. | 714/34 |
| 2003/0229825 A1 * | 12/2003 | Barry et al. | 714/38 |
| 2005/0044533 A1 | 2/2005 | Nesbit et al. | |
| 2005/0120276 A1 * | 6/2005 | Kolawa et al. | 714/38 |
| 2005/0223361 A1 | 10/2005 | Belbutte | |
| 2006/0117310 A1 | 6/2006 | Daniels et al. | |
| 2006/0195724 A1 * | 8/2006 | Filho | 714/35 |
| 2006/0277439 A1 * | 12/2006 | Davia et al. | 714/38 |
| 2007/0240116 A1 * | 10/2007 | Bangel et al. | 717/124 |
| 2008/0109790 A1 * | 5/2008 | Farnham et al. | 717/128 |
| 2008/0126867 A1 * | 5/2008 | Pandarinathan et al. | 714/37 |

OTHER PUBLICATIONS

Rosenblum et al., "Using Coverage Information to Predict the Cost-Effectiveness of Regression Testing Strategies," *IEEE Transactions on Software Engineering* 23:3 (Mar. 1997), pp. 146-156.

\* cited by examiner

*Primary Examiner* — Scott T Baderman
*Assistant Examiner* — Loan Truong

(57) ABSTRACT

A computer-implemented method for evaluating software code includes measuring a first coverage of a test applied to the software code and then making a modification in a first section of the software code. A second coverage of the test applied to the software code is measured after making the modification. A difference is identified between the first coverage and the second coverage in a second section of the software code, which is separate from the first section and was not modified since the first coverage was measured, and an indication of the difference is output.

20 Claims, 2 Drawing Sheets

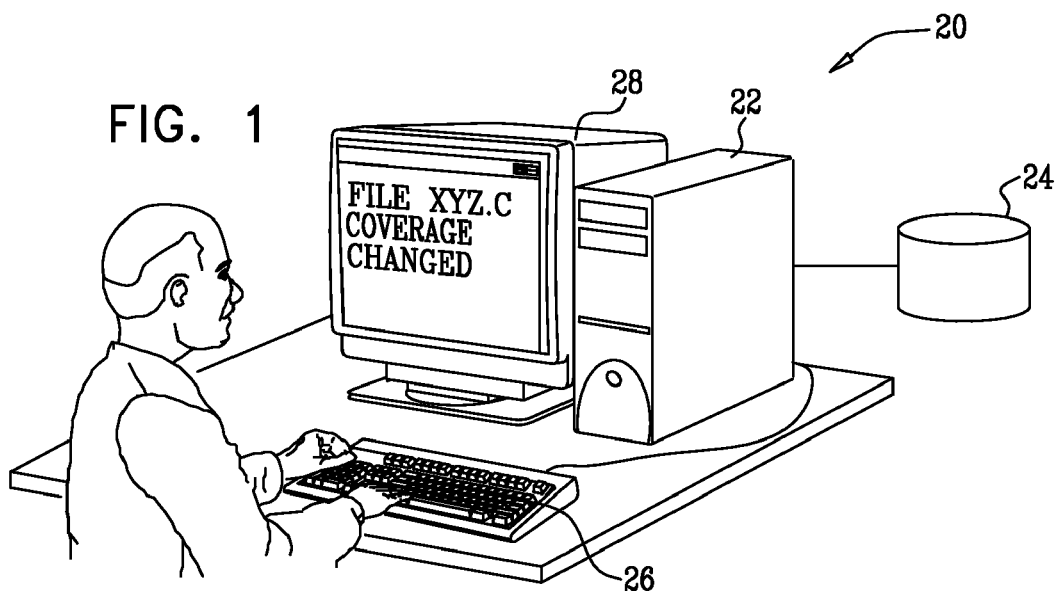
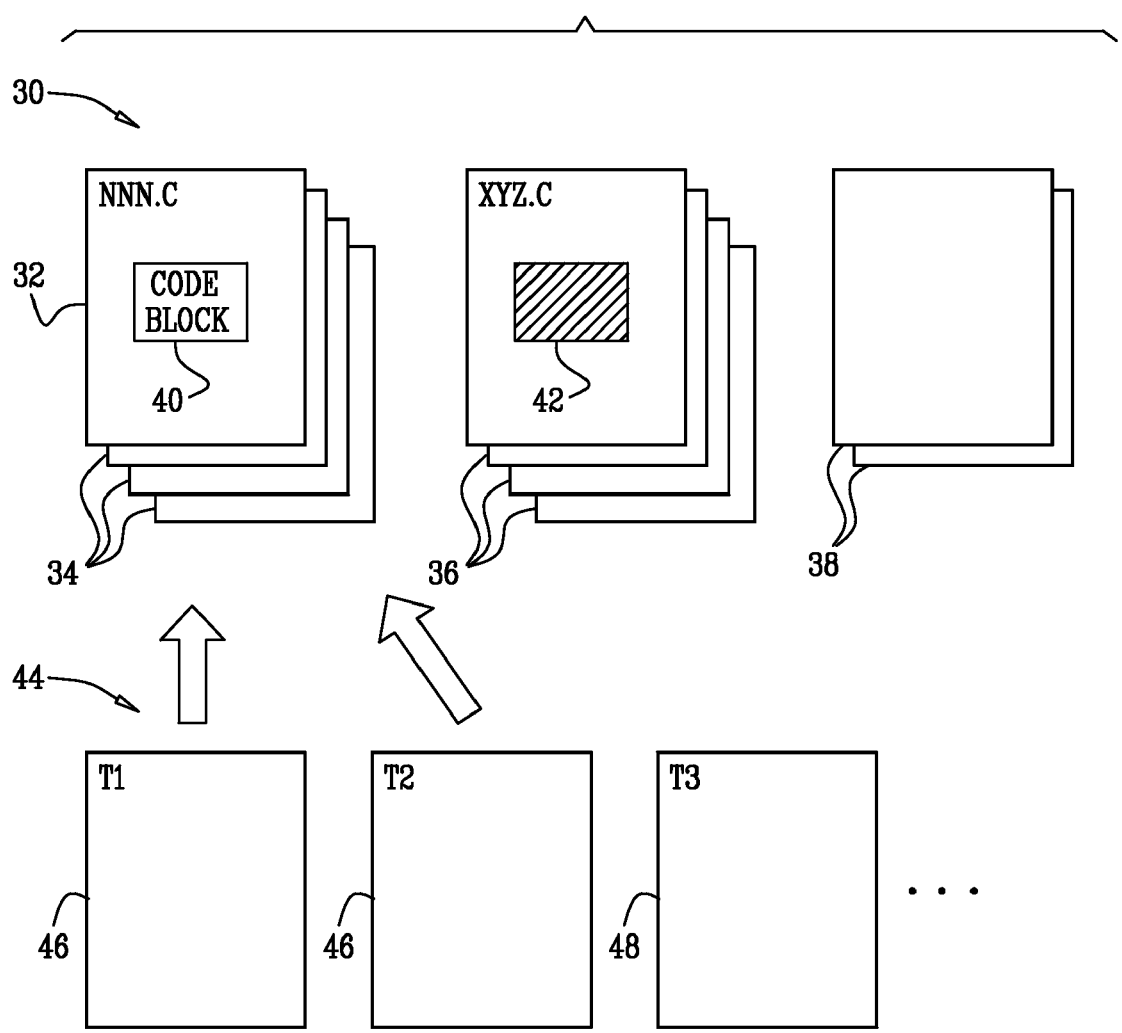

DETECTING UNEXPECTED IMPACT OF SOFTWARE CHANGES USING COVERAGE ANALYSIS

FIELD OF THE INVENTION

The present invention relates generally to computer systems and software, and specifically to detecting bugs in software code.

BACKGROUND OF THE INVENTION

Regression testing is a technique for discovering bugs that may have been introduced into software code as an unintended result of changes made to the code. This sort of testing is typically initiated after a programmer has attempted to fix a recognized bug or otherwise changed or added code to an existing program. For this purpose, programmers often develop a suite of tests, in the form of inputs, commands and execution parameters, for example, that are applied to exercise various parts of the code after a change has been made.

Software code coverage analysis is commonly used to track areas of a program that are exercised by a set of tests (and thus to find areas that are not exercised). A code coverage analyzer is a software tool that determines which lines of code were executed in a given test run. It can be used to give a quantitative measure of code coverage, as well as to assist in creating additional test cases to increase coverage and identify redundant test cases that do not increase coverage. For example, Bullseye Testing Technology (Redmond, Wash.) offers the BullseyeCoverage code coverage analyzer for C++ and C, which can be used to evaluate various coverage measures, including line coverage, statement coverage, branch coverage, condition coverage and function coverage. Rosenblum et al. describe a method for choosing an efficient regression test suite based on coverage analysis in "Using Coverage Information to Predict the Cost-Effectiveness of Regression Testing Strategies," *IEEE Transactions on Software Engineering* 23:3 (March, 1997), pages 146-156.

Another use of coverage analysis in test suite generation is described in U.S. Patent Application Publication 2005/0044533. A current software build is compared to a reference software build, which is typically a known, previous build. The comparison identifies those areas in the current software build that have changed with regard to the reference software build. The identified areas are used by a coverage analysis process to determine a focused test suite to test the modified areas of the current build.

U.S. Patent Application Publication 2005/0223361 describes another method for non-redundant software testing, based on identifying changes in the execution paths of a software program. Test cases capable of traversing the changed or new execution paths are identified and executed to test the modified code.

In contrast to regression testing, software change impact analysis provides a forecast of the potential effects of changes before the changes are implemented. Impact analysis, in other words, estimates what will be affected in software and related documentation if a proposed software change is made. For example, U.S. Patent Application Publications 2006/0117310 describes a method for analyzing the impact of an update to a software system. The impact analysis identifies resources that are affected by the update, such as configuration information and executable code in dynamic link libraries.

SUMMARY OF THE INVENTION

Embodiments of the present invention provide methods, apparatus and software products for evaluating software code. A processor measures a first coverage of a test applied to the software code before a programmer makes a modification in a first section of the code, and measures a second coverage after the modification has been made. The processor identifies differences between the first coverage and the second coverage in other, unmodified sections of the software code and outputs an indication of the differences. The programmer may use this indication in debugging the code The present invention will be more fully understood from the following detailed description of the embodiments thereof, taken together with the drawings in which:

BRIEF DESCRIPTION OF THE DRAWINGS

FIG. 1 is a schematic, pictorial illustration of a system for debugging software code, in accordance with an embodiment of the present invention;

FIG. 2 is a block diagram showing components of a software program that are modified and tested in accordance with an embodiment of the present invention.

DETAILED DESCRIPTION OF EMBODIMENTS

Figure 3:
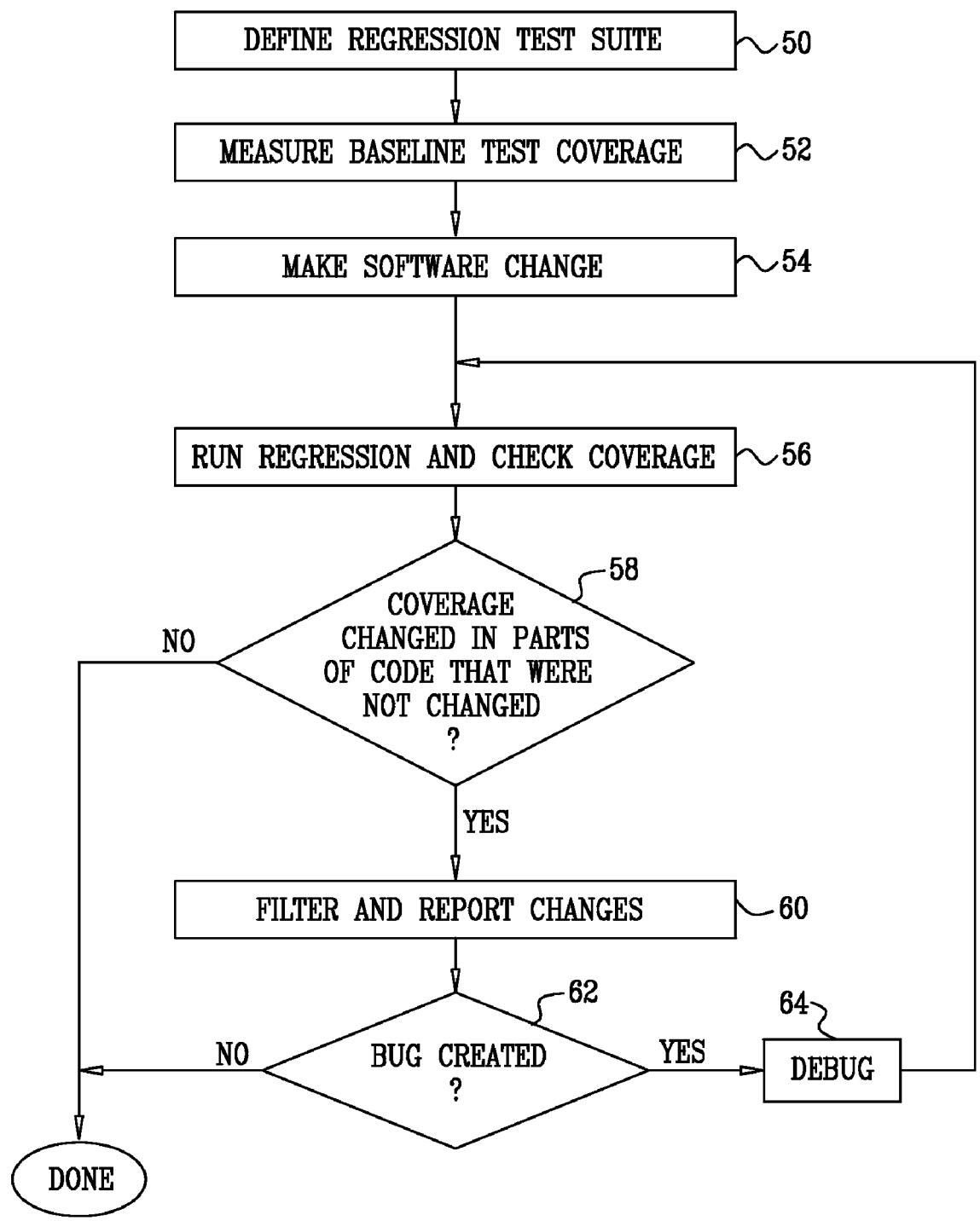
FIG. 3 is a flow chart that schematically illustrates a method for testing and debugging software code, in accordance with an embodiment of the present invention.

When programmers make modifications to an existing software program in order to fix a recognized bug or to add new functionality, these modifications often give rise to unexpected new bugs. These new bugs can be manifested not only in the section of the software code that was modified, but also in the behavior of other, unmodified sections of the code, typically due to interaction between the sections that the programmer did not take into account. Current methods for detecting these sorts of bugs, such as impact analysis and regression testing, are time-consuming and not completely effective.

Embodiments of the present invention that are described hereinbelow provide an efficient tool that can be used to detect bugs arising from modifications in a program that might otherwise escape the programmer's attention. The tool is based on a novel combination of regression testing and coverage analysis, stemming from the realization that changes in test coverage may be indicative of unintended changes in the control flow of the program. The tool detects changes in coverage that have occurred in unmodified sections of the program in order to warn and otherwise assist the programmer in identifying and fixing these bugs.

FIG. 1 is a schematic, pictorial illustration of a system 20 for debugging software code, in accordance with an embodiment of the present invention. System 20 comprises a code processor 22, which is operated by a programmer to analyze and debug software code, which is typically stored in a memory 24. The programmer interacts with processor 22 via a user interface, which typically comprises an input device 26, such as a keyboard and/or mouse, and an output device 28, such as a display monitor and/or printer.

Processor 22 applies selected tests from a regression test suite to the software code before and after the programmer makes modifications in the code. The processor measures the coverage of the tests before and after a given modification, and generates an output that is indicative of changes that have occurred in the coverage (particularly in sections of the code that were not modified.) The output may be delivered to the programmer via output device 28 and/or recorded in memory 24. Typically, the programmer responds to this output by reviewing the code to find the cause of the coverage change, and then debugging the code if necessary. Alternatively or additionally, processor 22 may automatically suggest or implement a code correction or may perform other analysis or invoke other debugging tools.

Typically, processor 22 comprises a general-purpose computer, which is programmed in software to carry out the functions described herein. The software may be downloaded to the computer in electronic form, via a network, for example, or it may alternatively be provided on tangible media, such as optical, magnetic, or electronic memory. Processor 22 may comprise a single computer, as illustrated in FIG. 1, or it may comprise a group of two or more computers, with the various functions divided up among them.

Reference is now made to FIGS. 2 and 3, which schematically illustrate a method for testing and debugging software code in a software program 30, in accordance with an embodiment of the present invention. FIG. 2 is a block diagram that schematically shows code sections 32, 34, 36, 38 of program 30 and tests 46, 48, . . . , in a regression test suite 44, which are applied in order to test the program 30. Sections 32, 34, 36, 38 are identifiably-separate components of program 30. For instance, each section may comprise a different file or class or a particular group of files or classes.

FIG. 3 is a flow chart that shows steps in the method of testing and debugging program 30 following a modification in the program, as described hereinbelow. Although this method is illustrated, for the sake of clarity, with reference to the particular program structure shown in FIG. 2, the principles of this method may be applied, mutatis mutandis, to substantially any sort of program organization for which a regression test suite can be defined, as will be apparent to those skilled in the art. For instance, the coverage analysis that is performed as part of this method may relate to functional coverage, i.e., sections 32, 34, 36, 38 may be functional blocks of the program code, rather than structural elements such as files or classes. Functional coverage techniques that may be used in this context are described, for example, by Piziali, in *Functional Verification Coverage and Analysis* (Kluwer Academic Publishers, Boston, 2004).

Test suite 44 is defined and developed for regression testing of program 30, at a test definition step 50. Methods for designing test suites are known in the art and are beyond the scope of the present invention, for which any suitable method of test design may be used. Tests 46, 48, . . . , in suite 44 are generally chosen and designed so that they collectively give good coverage to the various sections of program 30, using techniques described above in the Background of the Invention, for example. Typically, a certain set of the tests in test suite 44 is defined for regression testing of each section of program 30, wherein the tests defined for each section give good coverage of that section, but not necessarily of other sections of the program.

Processor 22 may keep a record of which tests cover each particular code section or group of sections, so that the appropriate regression tests may be run after any given code modification. Thus, in the example shown in FIG. 2, the processor has determined by suitable coverage analysis that tests 46, labeled T1 and T2, cover sections 32 and 34, whereas test 48, labeled T3, covers other sections of the program. These coverage measurements may be made, for instance, using the BullseyeCoverage tool mentioned in the Background of the Invention or other coverage analyzers that are known in the art. Some compiler packages (such as the Intel® Fortran compiler) offer test prioritization capability, which can be used to select and prioritize the tests that are most relevant to the subset of the software code that has been changed.

Continuing with this example, it is assumed that a programmer plans to make a modification in a code block 40 in section 32, which is a file named NNN.C. Before making the modification, processor 22 makes a baseline measurement of coverage of the associated tests 46 (T1 and T2), at a first coverage measurement step 52. The baseline measurement may have been made previously and stored in memory 24, for instance, in which case it is not necessary to repeat the measurement before making the code modification. Alternatively, this measurement may be invoked, either by the programmer or automatically by processor 22, before the actual modification is made or before the modified code is compiled. After the baseline measurement has been stored, the software modification in block 40 is carried out, at a code modification step 54. The code is then compiled and prepared for testing.

Processor 22 runs tests 46 on program 30, and checks the post-modification coverage of the tests, at a regression testing step 56. In view of the modification to the code in block 40, some changes in coverage may be expected in section 32, and possibly in related sections 34, as well. For the most part, however, coverage changes are not expected in sections 36 and 38, which do not relate directly to the functions exercised by tests 46.

Processor 22 detects changes in coverage of unmodified sections of the code, at a change detection step 58. If no such changes are detected, the processor exits from the method of FIG. 3 and informs the programmer that there have been no significant coverage changes. In the example shown in FIG. 2, however, the processor determines that the coverage by T1 of a line 42 of code in file XYZ.C has changed. The change may be detected, for instance, because line 42 previously was not covered by T1 and has now been covered or, alternatively, because line 42 was covered previously but is no longer covered. Alternatively or additionally, coverage changes of this sort may be detected and analyzed with granularity either coarser or finer than a single line of code.

As noted earlier, the unexpected change in the coverage of line 42 in block 36 may be indicative of a bug that the modification in block 40 has introduced into program 30, due to an unintended effect of the modification. Processor 22 therefore outputs to the programmer an indication of the coverage change via output device 28, at a reporting step 60. The report may simply comprise a listing of any and all changes that have occurred between the pre- and post-modification coverage measurements and the test or tests in which the changes occurred. (If two or more tests caused the same change, the programmer or processor 22 may be able to infer the cause of the change on the basis of the common features of these tests.)

Alternatively, processor 22 may filter the changes at step 60 before reporting them to the programmer. For example, the programmer or the processor may indicate groupings of code sections (such as sections 32 and 34), so that the processor reports only the coverage changes that occur outside the group to which the modified section belongs. As another example, the programmer may indicate to the processor that coverage changes in certain code sections, such as "bookkeeping" blocks in one of sections 38, are not of interest. Alternatively or additionally, upon reviewing the list of coverage changes, the programmer may manually mark (using a mouse on the display monitor, for instance) the changes that are not of interest. Based on the programmer's selections, the processor may then derive rules to be applied in filtering out certain coverage changes that may occur in subsequent iterations through step 60. For example, if the programmer consistently marks off coverage change indications with respect to a particular file, routine or program variable, the processor may determine that it should not warn the user of future coverage changes relating to that file, routine or variable.

The programmer, assisted by processor 22, checks the coverage change indications that were generated at step 60 in order to determine whether they are indicative of bugs that have been created in program 30, at a bug evaluation step 62. If the programmer and/or processor determines at step 62 that no new bug has been created, the processor exits from the method of FIG. 3.

Otherwise, if a bug has been found to exist, the programmer debugs the code, using the tools, hints and warnings provided by the processor, at a debugging step 64. For example, processor 22 may automatically insert a breakpoint in the vicinity of line 42 and open a debugging window at the point in test 46 at which the unexpected coverage change occurs, thus enabling the programmer to step through program 30 in the vicinity of this line. After debugging, the processor may repeat the regression testing and coverage checking, beginning from step 56, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for evaluating software code, comprising:
   selecting a first section and a second section of the software code, the first section being separate from the second section;
   measuring a first coverage of the second section by a test applied to the software code;
   making a modification only in the first section of the software code after measuring the first coverage;
   measuring a second coverage of the second section by applying the test to the software code a second time after making the modification;
   identifying a difference between the first coverage and the second coverage of the second section of the software code; and
   outputting an indication of the difference, wherein at least one of the steps of measuring a first coverage, measuring a second coverage, and outputting an indication is performed using a computer.

2. The method according to claim 1, further comprising debugging the software code responsively to the indication.

3. The method according to claim 1, wherein the second section is selected from a group of types of sections consisting of files, classes and functional blocks.

4. The method according to claim 1, wherein identifying the difference comprises detecting a coverage change selected from a group of coverage changes consisting of determining that at least a first line of the software code in the second section was exercised by the test following the modification but not before the modification, and determining that at least a second line of the software code in the second section was exercised by the test before the modification but not following the modification.

5. The method according to claim 1, wherein measuring the first and second coverage comprises applying multiple tests in a regression test suite to the software code, and wherein outputting the indication comprises indicating a coverage change and identifying at least one of the tests in which the coverage change was found to have occurred.

6. The method according to claim 1, wherein identifying the difference comprises detecting multiple coverage changes in sections of the software code that are separate from the first section, and filtering the coverage changes responsively to a predetermined filtering criterion in order to select at least one of the changes from which derive the indication of the difference, while ignoring another of the changes.

7. The method according to claim 6, wherein filtering the coverage changes comprises receiving an input from a programmer indicating at least one section of the software code in which the coverage changes are not of interest, and ignoring the coverage changes that occur in the at least one section.

8. The method according to claim 1, wherein identifying the difference comprises detecting a coverage change at a given line in the software code, and wherein debugging the software code comprises inserting a breakpoint in a vicinity of the given line and automatically opening a debugger while running the test.

9. Apparatus for evaluating software code, comprising:
   an output device; and
   a code processor, which is arranged to:
   accept a selection of a first section and a second section of the software code, the first section being separate from the second section;
   measure a first coverage of a test applied to the second section of the software code before a modification is made only in the first section of the software code, and to measure a second coverage of the test applied to the second section of the software code after making the modification;
   identify a difference between the first coverage and the second coverage; and
   output an indication of the difference via the output device for use in debugging the software code.

10. The apparatus according to claim 9, wherein the second section is selected from a group of types of sections consisting of files, classes and functional blocks.

11. The apparatus according to claim 9, wherein the difference comprises a coverage change selected from a group of coverage changes consisting of at least a first line of the software code in the second section that was exercised by the test following the modification but not before the modification, and at least a second line of the software code in the second section that was exercised by the test before the modification but not following the modification.

12. The apparatus according to claim 9, wherein the code processor is arranged to apply multiple tests in a regression test suite to the software code, and wherein the output indicates a coverage change and at least one of the tests in which the coverage change was found to have occurred.

13. The apparatus according to claim 9, wherein the code processor is arranged to detect multiple coverage changes in sections of the software code that are separate from the first section, and to filter the coverage changes responsively to a predetermined filtering criterion in order to select at least one of the changes from which derive the indication of the difference, while ignoring another of the changes.

14. The apparatus according to claim 9, wherein the code processor is arranged to detect a coverage change at a given line in the software code, and to insert a breakpoint in a vicinity of the given line and automatically open a debugger while running the test.

15. A computer software product for evaluating software code, the product comprising a computer-readable medium in which program instructions are stored, which instructions, when read by a computer, cause the computer to:

accept a selection of a first section and a second section of the software code, the first section being separate from the second section;

measure a first coverage of a test applied to the second section of the software code before a modification is made only in the first section of the software code, and to measure a second coverage of the test applied to the second section of the software code after making the modification;

to identify a difference between the first coverage and the second coverage; and to output an indication of the difference for use in debugging the software code.

16. The product according to claim 15, wherein the second section is selected from a group of types of sections consisting of files, classes and functional blocks.

17. The product according to claim 15, wherein the difference comprises a coverage change selected from a group of coverage changes consisting of at least a first line of the software code in the second section that was exercised by the test following the modification but not before the modification, and at least a second line of the software code in the second section that was exercised by the test before the modification but not following the modification.

18. The product according to claim 15, wherein the instructions cause the computer to apply multiple tests in a regression test suite to the software code, and wherein the output indicates a coverage change and at least one of the tests in which the coverage change was found to have occurred.

19. The product according to claim 15, wherein the instructions cause the computer to detect multiple coverage changes in sections of the software code that are separate from the first section, and to filter the coverage changes responsively to a predetermined filtering criterion in order to select at least one of the changes from which derive the indication of the difference, while ignoring another of the changes.

20. The product according to claim 15, wherein the instructions cause the computer to detect a coverage change at a given line in the software code, and to insert a breakpoint in a vicinity of the given line and automatically open a debugger while running the test.

\* \* \* \* \*